(12) United States Patent
Swab

(10) Patent No.: US 10,823,466 B2
(45) Date of Patent: Nov. 3, 2020

(54) ARTIFICIAL ASPIRATION DEVICE FOR A COMPRESSED NATURAL GAS ENGINE

(71) Applicant: CARRIER CORPORATION, Palm Beach Gardens, FL (US)

(72) Inventor: Michael Swab, Acworth, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 152 days.

(21) Appl. No.: 15/781,805

(22) PCT Filed: Dec. 9, 2016

(86) PCT No.: PCT/US2016/065851
§ 371 (c)(1),
(2) Date: Jun. 6, 2018

(87) PCT Pub. No.: WO2017/100590
PCT Pub. Date: Jun. 15, 2017

(65) Prior Publication Data
US 2018/0335232 A1    Nov. 22, 2018

Related U.S. Application Data

(60) Provisional application No. 62/265,518, filed on Dec. 10, 2015.

(51) Int. Cl.
*F25B 27/00* (2006.01)
*F02B 63/04* (2006.01)
(Continued)

(52) U.S. Cl.
CPC ............. *F25B 27/00* (2013.01); *F02B 37/00* (2013.01); *F02B 43/00* (2013.01); *F02B 43/10* (2013.01);
(Continued)

(58) Field of Classification Search
CPC .................................. F25B 27/00; F02B 37/00
(Continued)

(56) References Cited

U.S. PATENT DOCUMENTS 5,081,977 A * 1/1992 Swenson ................. F02B 43/00
123/1 A
5,203,311 A     4/1993 Hitomi
(Continued)

FOREIGN PATENT DOCUMENTS

DE    102007058964 A1    6/2009
KR     20010048618 A     6/2001
(Continued)

OTHER PUBLICATIONS

Notification of Transmittal of the International Search Report for Internaltion Application No. PCT/US2016/065851; dated Feb. 22, 2017; 1-8 pages.
(Continued)

*Primary Examiner* — Henry T Crenshaw
(74) *Attorney, Agent, or Firm* — Cantor Colburn LLP

(57) ABSTRACT

A transport refrigeration system (20) is provided. The transport refrigeration system includes: a natural gas engine (26), a compressed natural gas storage tank (60), an artificial aspiration device (70) providing decompressed natural gas and compressed air to the natural gas engine, an electric generation device (24) powered by the natural gas engine and providing an electric output, and a refrigeration unit (22) electrically powered by the electric output of the electric generation device.

4 Claims, 2 Drawing Sheets

(51) Int. Cl.
*F02B 43/00* (2006.01)
*F25D 11/00* (2006.01)
*F02B 37/00* (2006.01)
*F25D 17/06* (2006.01)
*F02B 43/10* (2006.01)
*F02B 63/06* (2006.01)

(52) U.S. Cl.
CPC ............ *F02B 63/04* (2013.01); *F25D 11/003* (2013.01); *F25D 17/067* (2013.01); *F02B 63/06* (2013.01); *F02B 2043/103* (2013.01); *Y02T 10/144* (2013.01); *Y02T 10/32* (2013.01)

(58) Field of Classification Search
USPC .......................................................... 62/126
See application file for complete search history.

(56) References Cited

U.S. PATENT DOCUMENTS

| | | | |
|---|---|---|---|
| 5,313,783 A | 5/1994 | Althaus | |
| 5,353,597 A | 10/1994 | Faulkner | |
| 5,549,096 A | 8/1996 | Swenson et al. | |
| 6,216,458 B1 | 4/2001 | Alger | |
| 6,223,546 B1 * | 5/2001 | Chopko | B60H 1/3232 62/243 |
| 6,244,256 B1 | 6/2001 | Wall | |
| 6,779,344 B2 | 8/2004 | Hartman | |
| 7,243,495 B2 | 7/2007 | Whelan | |
| 8,061,334 B2 | 11/2011 | Eitel | |
| 8,141,361 B2 | 3/2012 | Andersen | |
| 9,091,240 B2 | 7/2015 | Grant | |
| 2007/0289325 A1 | 12/2007 | Stone | |
| 2009/0173071 A1 | 7/2009 | Kapich | |
| 2011/0016870 A1 | 1/2011 | Kashler | |
| 2013/0319359 A1 * | 12/2013 | Evans | B60K 6/24 123/1 A |
| 2014/0373531 A1 * | 12/2014 | Wong | F02B 43/02 60/605.1 |
| 2015/0167588 A1 | 6/2015 | Beutel | |

FOREIGN PATENT DOCUMENTS

| | | |
|---|---|---|
| WO | 2013134355 A1 | 9/2013 |
| WO | 2014085672 A1 | 6/2014 |

OTHER PUBLICATIONS

Written Opinion of the International Searching Authority for International Application No. PCT/US2016/065851; dated Feb. 22, 2017; 1-8 pages.

* cited by examiner

ARTIFICIAL ASPIRATION DEVICE FOR A COMPRESSED NATURAL GAS ENGINE

BACKGROUND OF THE DISCLOSURE

The embodiments herein generally relate to transport refrigeration systems powered by natural gas engines and a method of operating such systems.

Refrigerated trucks and trailers are commonly used to transport perishable cargo, such as, for example, produce, meat, poultry, fish, dairy products, cut flowers, and other fresh or frozen perishable products. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine or a natural gas engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "electric" transport refrigeration system for a refrigerated trailer application is also commercially available through Carrier Corporation headquartered in Farmington, Conn., USA. In the electric transport refrigeration system, a prime mover (engine) is carried on and considered part of the transport refrigeration system, drives an AC generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an electric transport refrigeration system.

In "electric" transport refrigeration systems that utilize a natural gas engine, the natural gas must be compressed and stored in high pressure containers to fit aboard refrigeration trucks. The compressed natural gas must be then decompressed to be consumed by the natural gas engine. The natural gas is typically decompressed through a series of regulators but this decompression process is inefficient.

BRIEF DESCRIPTION OF THE DISCLOSURE

According to one embodiment, a transport refrigeration system includes a natural gas engine. Also included is a compressed natural gas storage tank. Yet further included is an artificial aspiration device providing decompressed natural gas and compressed air to the natural gas engine. Still further included, is an electric generation device powered by the natural gas engine and providing an electric output. Also included is a refrigeration unit electrically powered by the electric output of the electric generation device.

In addition to one or more of the features described above, or as an alternative, further embodiments may include wherein the artificial aspiration device further comprises a turbine assembly comprising, a turbine housing, at least one turbine enclosed within the turbine housing, a compressed natural gas inlet in the turbine housing and a decompressed natural gas outlet in the turbine housing; a compressor assembly comprising, a compressor housing, at least one compressor enclosed within the compressor housing, an air inlet in the compressor housing and a hot compressed air outlet in the compressor housing; and a drive system mechanically connecting the at least one turbine to the at least one compressor.

In addition to one or more of the features described above, or as an alternative, further embodiments may include a charge air intercooler jacket encasing the turbine housing, the charge air intercooler jacket comprises a hot compressed air inlet and a cooled compressed air outlet; and a transfer tube connecting the hot compressed air outlet to the hot compressed air inlet.

In addition to one or more of the features described above, or as an alternative, further embodiments may include the hot compressed air from the hot compressed air outlet is cooled by transporting the hot compressed air through the transfer tube to the charge air intercooler jacket and passing the air over the turbine housing.

According to another embodiment, an artificial aspiration device includes a turbine assembly comprising, a turbine housing, at least one turbine enclosed within the turbine housing, a compressed natural gas inlet in the turbine housing and a decompressed natural gas outlet in the turbine housing. Also included is a compressor assembly comprising, a compressor housing, at least one compressor enclosed within the compressor housing, an air inlet in the compressor housing and a hot compressed air outlet in the compressor housing. Yet further included is a drive system mechanically connecting the at least one turbine to the at least one compressor.

In addition to one or more of the features described above, or as an alternative, further embodiments may include a charge air intercooler jacket encasing the turbine housing, the charge air intercooler jacket comprises a hot compressed air inlet and a cooled compressed air outlet; and a transfer tube connecting the hot compressed air outlet to the hot compressed air inlet.

In addition to one or more of the features described above, or as an alternative, further embodiments may include the hot compressed air from the hot compressed air outlet is cooled by transporting the hot compressed air through the transfer tube to the charge air intercooler jacket and passing the air over the turbine housing.

According to another embodiment, a method of fueling a natural gas engine is provided. The method includes decompressing compressed natural gas using a turbine assembly, wherein the turbine assembly comprises a turbine housing, at least one turbine enclosed within the turbine housing, a compressed natural gas inlet in the turbine housing and a decompressed natural gas outlet in the turbine housing. The method also includes rotating the at least one turbine, using the compressed natural gas, wherein the at least one turbine is mechanically connected through a drive system to a compressor assembly, wherein the compressor assembly comprises, a compressor housing, at least one compressor enclosed within the compressor housing, an air inlet in the compressor housing and a hot compressed air outlet in the compressor housing. The method further includes rotating the at least one compressor, through the drive system, using the at least one turbine. The method yet further includes compressing air from the air inlet, using the at least one compressor. The method also includes transporting hot compressed air out the hot compressed air outlet. The method also further includes cooling the hot compressed air from the hot compressed air outlet. The method also further includes transporting cooled compressed air to the natural gas engine. The method also includes transporting decompressed natural gas from the decompressed natural gas outlet to the natural gas engine.

In addition to one or more of the features described above, or as an alternative, further embodiments may include transporting the hot compressed air through a transfer tube to a charge air intercooler jacket that encases the turbine housing, wherein the charge air intercooler jacket comprises a hot compressed air inlet and a cooled compressed air outlet, and the transfer tube connects the hot compressed air outlet to the hot compressed air inlet.

In addition to one or more of the features described above, or as an alternative, further embodiments may include cooling the hot compressed air in the charge air intercooler jacket by passing the air over the turbine housing and transporting the cooled compressed air out the cooled compressed air outlet.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
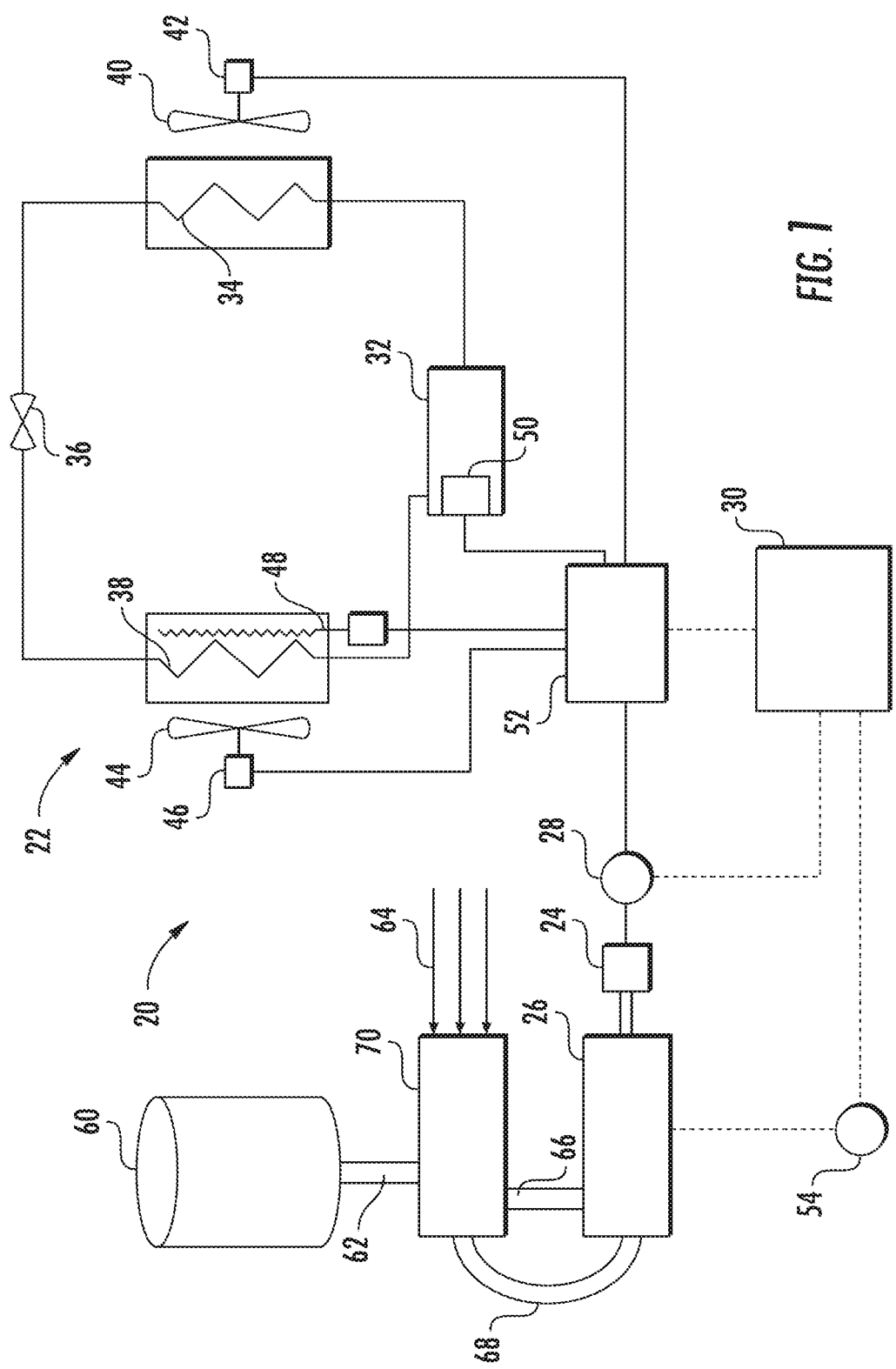
FIG. 1 is a schematic illustration of a transport refrigeration system in accordance with the disclosure.

Referring to FIG. 1, a transport refrigeration system 20 includes a refrigeration unit 22, an electric generation device 24, a natural gas engine 26 for driving the electric generation device 24, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric heater 48. The controller 30 may also be able to selectively operate the natural gas engine 26, typically through an electronic engine controller 54 operatively associated with the natural gas engine 26.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger.

The natural gas engine 26, drives the electric generation device 24 that generates electrical power. The driveshaft of the natural gas engine 26 drives the shaft of the electric generation device 24. In an electrically powered embodiment of the transport refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The refrigeration system 20 also may contain a voltage sensor 28 to sense the voltage of the electric generation device 24.

Figure 2:
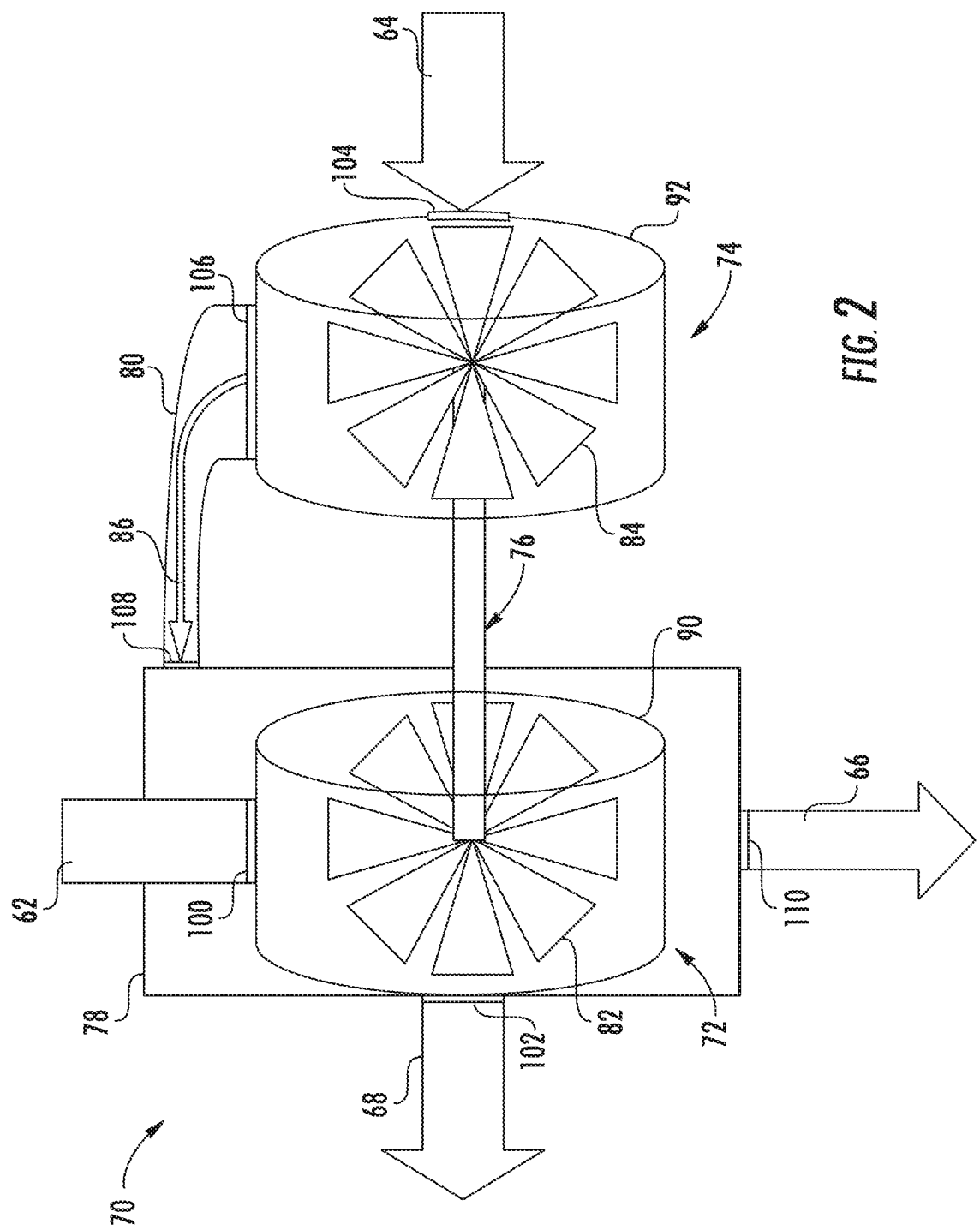
FIG. 2 is a schematic illustration of an artificial aspiration device, according to an exemplary embodiment.

Current technology requires that natural gas be stored at a high pressure in order to achieve a practical amount of natural gas in the limited space of the storage tank 60 aboard a transportation vehicle. The natural gas must then be decompressed to a low pressure to be consumable by a natural gas engine 26. For instance many tanks store natural gas at around 3600 PSI and then the natural gas must be decompressed to less than about 100 PSI for viable use in some natural gas engines 26. Typically, this decompression is accomplished by a series of regulators, which depressurize the natural gas to an operable pressure suitable for the natural gas engine 26. Instead of decompressing the natural gas via a series of regulators, an artificial aspiration device 70 will decompress the natural gas via a turbine 82 within a turbine assembly 72, as seen in FIG. 2. In further embodiments, the turbine assembly 72 may also include multiple turbines 82 if multiple stage turbines are required to decompress the compressed natural gas to acceptable levels. The decompressed natural gas 68 will then travel to the natural gas engine 26 to be consumed. This decompression process will eliminate the need of at least one regulator. Other regulators (not shown in FIGS. 1 and 2) may still be required before or after the artificial aspiration device 70 to achieve the exact pressure required by a natural gas engine 26. The decompression process will also lower the temperature of the entire turbine assembly 72 including the turbine housing 90. Heat is released during the compression process of natural gas, while conversely heat is absorbed during the decompression process.

Referring to FIG. 2, an artificial aspiration device 70 includes a turbine assembly 72 comprising, a turbine housing 90, at least one turbine 82 enclosed within the turbine housing 90, a compressed natural gas inlet 100 in the turbine housing 90 and a decompressed natural gas outlet 102 in the turbine housing 90. The artificial aspiration device 70 also includes, a compressor assembly 74 comprising, a compressor housing 92, at least one compressor 84 enclosed within the compressor housing 92, an ambient air inlet 104 in the compressor housing 92 and a hot compressed air outlet 106 in the compressor housing 92. The artificial aspiration device 70 further includes, a drive system 76 mechanically connecting the turbine 82 to the compressor 84. In further embodiments, the compressor assembly 74 may also include multiple compressors 84 if multiple stage compressors are required to compress the air 64 to the required levels. In one embodiment, the artificial aspiration device 70 includes a charge air intercooler jacket 78 encasing the turbine housing 90, the charge air intercooler jacket 78 includes a hot compressed air inlet 108 and a cooled compressed air outlet 110. In a further embodiment, the artificial aspiration device 70 also includes a transfer tube 80 connecting the hot compressed air outlet 106 to the hot compressed air inlet 108.

Compressed natural gas 62 from the storage tank 60 will enter the turbine assembly 72 via a compress natural gas inlet 100 in the turbine housing 90. Once the natural gas decompresses through rotating the turbine 82, the decompressed natural gas 68 will exit the turbine assembly 72 through a decompressed natural gas outlet 102 in the turbine housing 90 and then be transported to the natural gas engine 26 for combustion.

Further, the artificial aspiration device 70 will operate similar to a turbocharger to maximize efficiency. However instead of exhaust gas spinning the turbine 82, natural gas spins the turbine 82, which in turn will spin the compressor 84 via a drive system 76. The drive system 76 may be composed of a simple shaft mechanically connecting the turbine 82 and the compressor 84 or a more complex geared system. The turbine 82 provides power to the compressor 84, which compresses air 64 for use by the natural gas engine 26. The artificial aspiration device 70 may also comprise standard turbo charger parts such as, for example, pop off valves and waste gates.

Air 64 will enter the compressor assembly 74 via an ambient air inlet 104 in the compressor housing 92. Once the air 64 is compressed, the hot compressed air 86 will travel out of the compressor assembly 74 through the hot compressed air outlet 106. The compression process raises the temperature of the air 64, thus requires the hot compressed air 86 be cooled. Current turbochargers that use hot exhaust gas from the engine to spin a turbine 82, require a separate heat exchanger to cool the hot compressed air 86 before use by the engine. In one embodiment, in order to cool the hot compressed air 86, the air will be transported from the hot compressed air outlet 106 of the compressor assembly 74 through a transfer tube 80 to the hot compressed air inlet 108 of the charge air intercooler jacket 78. The hot compressed air 86 will be cooled by passing the hot compressed air 86 over the turbine housing 90. As mentioned above, the turbine housing 90 was cooled by the natural gas decompression process. Passing the hot compressed air 86 over the cooled turbine housing 90, may eliminate the need for a separate air to air intercooler heat exchanger to cool the hot compressed air 86 before use by the natural gas engine 26. The cooled compressed air 66 will then be transported out the cooled compressed air outlet 110 to the natural gas engine 26 for consumption.

Also, by spinning the turbine 82 with natural gas and not hot exhaust gas, it eliminates the need for special heat shielding in surrounding areas, more frequent oil changes, the use of synthetic oils and bearing cooling that is typically required to deal with the excessive heat of exhaust gas on the turbine assembly 72 in a conventional turbocharger. The elimination of excessive heat due to exhaust gas also reduces the risk of engine compartment fire due to overheating.

It is important to note that while the disclosure has described an artificial aspiration device 70 in conjunction with a natural gas engine 26 generating power for a transport refrigeration system 20, the artificial aspiration device may be used in conjunction with any engine that uses compressed natural gas including but not limited to stationary, marine, truck, automotive, aerospace or rail engines.

Further, while the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A transport refrigeration system comprising:
   a natural gas engine;
   a compressed natural gas storage tank;
   an artificial aspiration device providing decompressed natural gas and compressed air to the natural gas engine, the artificial aspiration device comprising:
      a turbine assembly comprising, a turbine housing, at least one turbine enclosed within the turbine housing, a compressed natural gas inlet in the turbine housing and a decompressed natural gas outlet in the turbine housing;
      a compressor assembly comprising, a compressor housing, at least one compressor enclosed within the compressor housing, an air inlet in the compressor housing and a hot compressed air outlet in the compressor housing;
      a drive system mechanically connecting the at least one turbine to the at least one compressor;
      a charge air intercooler jacket encasing the turbine housing, the charge air intercooler jacket comprises a hot compressed air inlet and a cooled compressed air outlet; and
      a transfer tube connecting the hot compressed air outlet to the hot compressed air inlet;
   an electric generation device powered by the natural gas engine and providing an electric output; and
   a refrigeration unit electrically powered by the electric output of the electric generation device.

2. The transport refrigeration system of claim 1, wherein:
the hot compressed air from the hot compressed air outlet is cooled by transporting the hot compressed air through the transfer tube to the charge air intercooler jacket and passing the air over the turbine housing.

3. An artificial aspiration device comprising:
   a turbine assembly comprising, a turbine housing, at least one turbine enclosed within the turbine housing, a compressed natural gas inlet in the turbine housing and a decompressed natural gas outlet in the turbine housing;
   a compressor assembly comprising, a compressor housing, at least one compressor enclosed within the compressor housing, an air inlet in the compressor housing and a hot compressed air outlet in the compressor housing; and
   a drive system mechanically connecting the at least one turbine to the at least one compressor;
   a charge air intercooler jacket encasing the turbine housing, the charge air intercooler jacket comprises a hot compressed air inlet and a cooled compressed air outlet; and
   a transfer tube connecting the hot compressed air outlet to the hot compressed air inlet.

4. The artificial aspiration device of claim 3, wherein:
the hot compressed air from the hot compressed air outlet is cooled by transporting the hot compressed air through the transfer tube to the charge air intercooler jacket and passing the air over the turbine housing.

* * * * *